Figure 1:
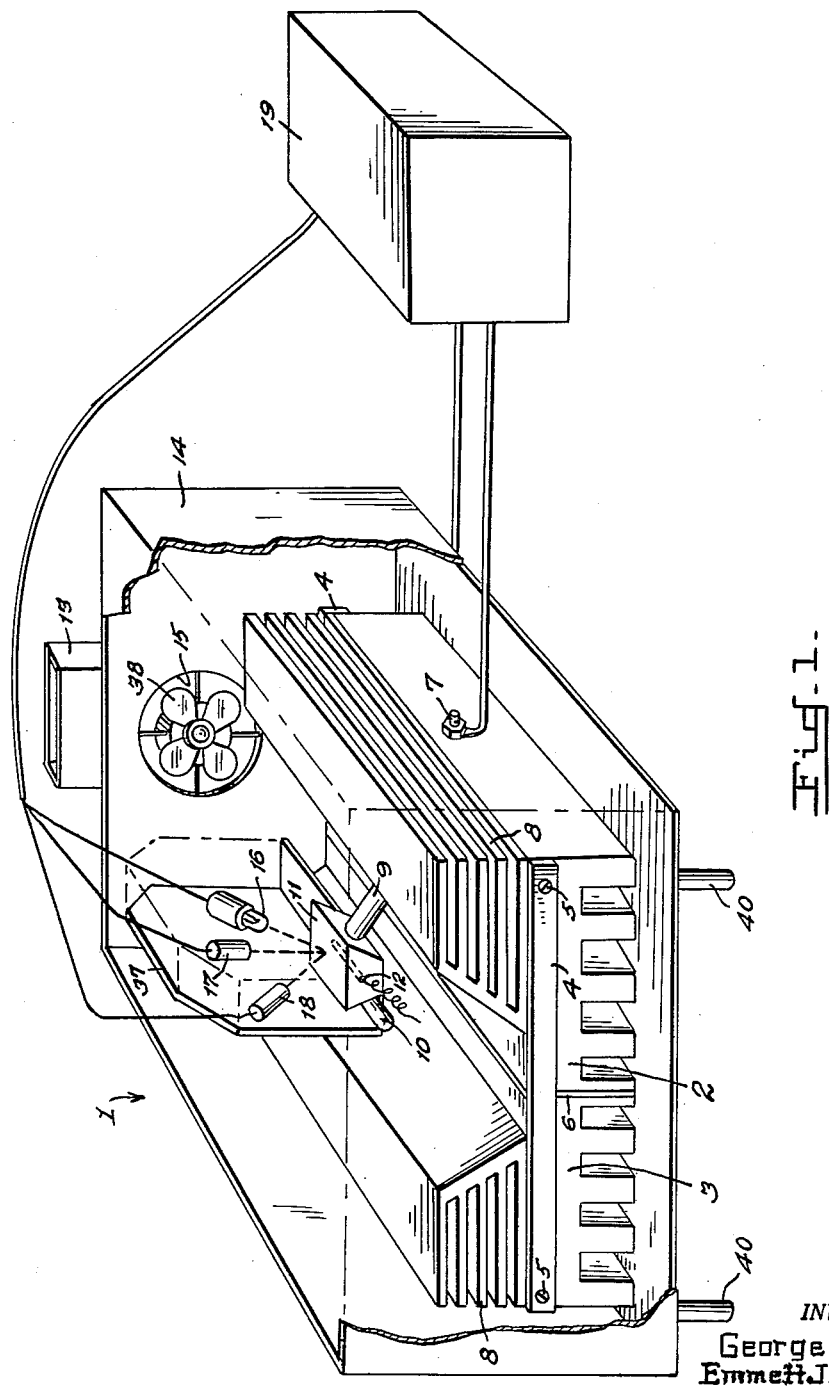

Dec. 3, 1963    G. A. DULK ETAL    3,112,648
PELTIER DEW POINT HYGROMETER
Filed Dec. 11, 1961    2 Sheets-Sheet 1

INVENTORS,
George A. Dulk
Emmett J. Pybus

By: S. J. Rotondi + A. J. Dupont

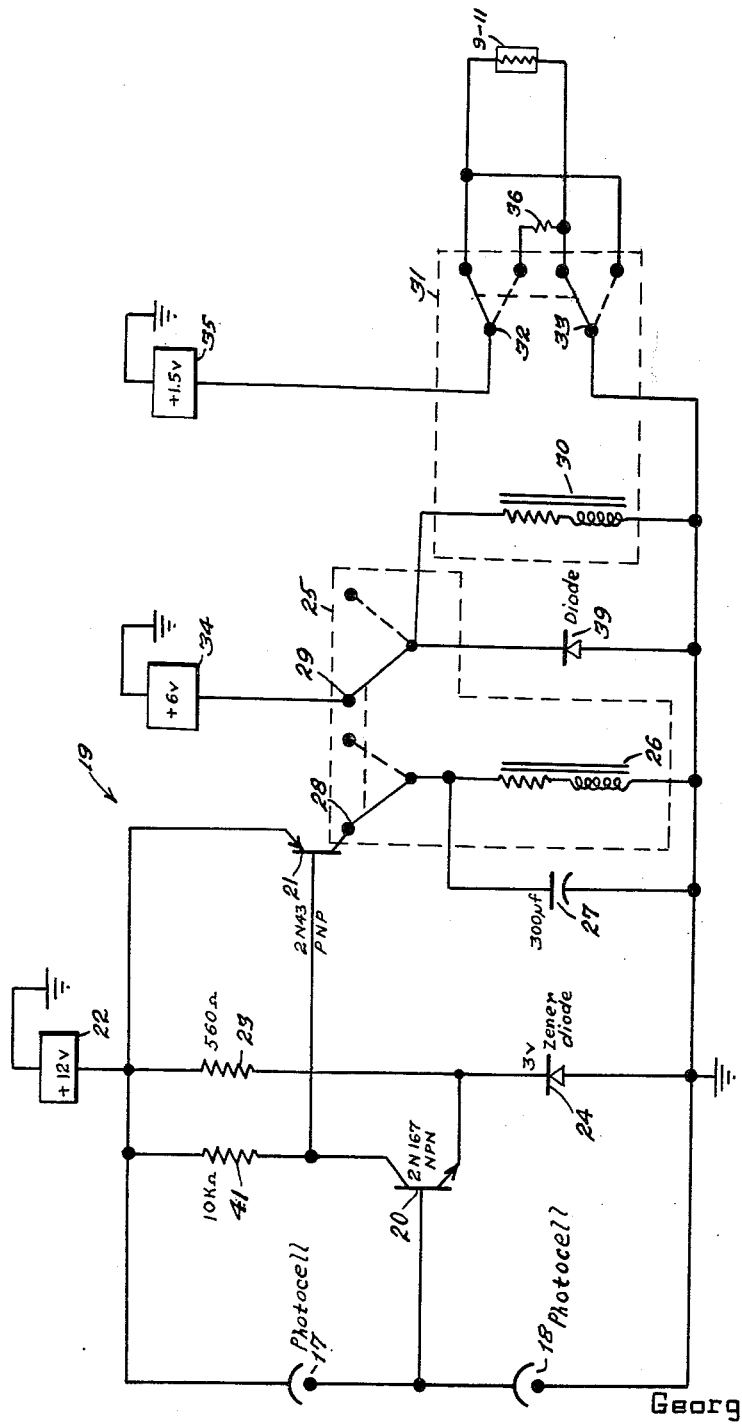

United States Patent Office 3,112,648
Patented Dec. 3, 1963

3,112,648
PELTIER DEW POINT HYGROMETER
George A. Dulk, Joppa, and Emmett J. Pybus, Havre de Grace, Md., assignors to the United States of America as represented by the Secretary of the Army
Filed Dec. 11, 1961, Ser. No. 158,617
1 Claim. (Cl. 73—336.5)
(Granted under Title 35, U.S. Code (1952), sec. 266)

The invention described herein may be manufactured and used by or for the Government for governmental purposes without the payment to us of any royalty thereon.

This invention relates in general to dew point hygrometers, and more particularly to a dew point hygrometer utilizing Peltier thermoelectric cooling.

Dew point hygrometers are widely used for determining and recording the dew point temperature of the air at some location where the information is required, such as a station of the Weather Bureau, for example, or as part of an instrument sent into the air on a balloon or rocket. Such a hygrometer, to be acceptable, must be inexpensive to construct and adapted to operate over extended periods of time in inaccessible places such as weather ballons, automatic weather stations, or the like. In addition, such hygrometers must be adapted to provide stable operation even when subject to adverse conditions.

It is, therefore, an object of this invention to provide a Peltier dew point hygrometer which is inexpensive to construct and which is adapted to operate over extended periods of time in inaccessible places.

Another object of the present invention is to provide a hygrometer with improved speed response.

Still another object of this invention is to provide a durable hygrometer having a high degree of accuracy.

A further object of this invention is to provide a hygrometer which is readily regulative.

The foregoing and other features of the invention will be described more fully hereinafter, reference being made to the accompanying drawings, in which:

FIGURE 1 is a perspective view of the Peltier hygrometer and control system; and FIGURE 2 is a circuit diagram of the electrical control system used to control the hygrometer.

The Peltier effect, one of the thermoelectric effects, is the cooling of the junction between two dissimilar materials when a current is passed through it. Heating of the junction is obtained by reversing the directing of current flow. The basic equation describing the phenomenon is $$\dot{Q} = jST_0 - \frac{1}{2}\rho j^2 - K\frac{dt}{dl}$$

where:
$\dot{Q}$ is the rate of heat absorbed at the junction from the environment
$j$ is the current density at the junction
S is the Seebeck coefficient for the material
$T_0$ is the temperature of the junction in degrees Kelvin
$\rho$ is the resistivity of the material
K is the heat conductivity of the material
$\frac{dt}{dl}$ is the temperature gradient across the length of material at a junction.

The above equation applies at the junction of the material elements (legs) comprising the junction.

The maximum change in temperature obtainable, $\Delta T_{max}$, can be approximated $$\Delta T_{max} = \frac{1}{2}ZT_0^2, \quad Z = \frac{S^2}{\rho K}$$

where Z is the figure of merit and $\rho$ equals the resistivity of the semiconductor material.

Referring now to FIGURE 1, there is shown an embodiment of the present invention in which the numeral 1 represents generally a Peltier type thermoelectric junction and its enclosure. The thermoelectric junction consists of two copper blocks 2 and 3 secured together by non-conductive strips 4 and screws 5. Located between the blocks 2 and 3 is an insulator strip 6 which serves to isolate the blocks electrically from each other. A terminal connection 7 is provided for each block. The copper blocks are preferably provided with fins 8 to give maximum area for heat dissipation.

A first and second piece of thermoelectric material 9 and 10 are electrically secured to the copper blocks 2 and 3, respectively. These pieces of material are of different type material, i.e., of the p and n type. The opposite ends of the pieces of material are secured electrically to a polished metal block 11. Also secured within block 11 is a resistance thermometer, or thermistor, or thermocouple 12 which may be located, for example, in an aperture as shown.

The blocks 2 and 3 are enclosed within a housing 14 and are secured to the inside of the housing by any suitable means (not shown). One end of the housing 14 has an opening 15 therein. Located within the opening is a fan 38 which is used to draw air across the fins in order to aid cooling. Fan 38 also draws air across the mirrored surface of block 11. An exhaust vent 13 is provided for expelling the air. Stand off mounting means 40 are provided for mounting the housing 14.

Secured to the top of the housing 14 is an observing means 37. The observing means 37 is mounted over a slot in the top of the housing 14 so that the illumination from the light source 16 will strike the mirrored surface of the polished block 11. Also mounted within observing means 37 are two photocells 17, 18 which may be of the semiconductor type. The photocell 18 is so mounted that it will receive the direct reflection of source 16 from the mirror surface of block 11. Photocell 17 is mounted directly over the mirrored surface so as to receive only indirect or diffused illumination from the source 16.

Referring to the circuit diagram of FIGURE 2, there is shown generally the control circuit 19 for operating the thermoelectric junction. The control circuit 19 is made up of a two-stage amplifier system having an NPN transistor 20 and a PNP transistor 21 connected together as direct current amplifiers. Connected to the base of transistor 20 are the two photocells 17, 18 (shown in FIG. 1) which are connected in series to form a voltage divider circuit. The collector of the transistor 20 is connected through a resistor 41 to a positive source of potential 22. Connected between the potential source 22 and ground is a second voltage divider circuit consisting of a resistor 23 connected in series with a Zener diode 24. The characteristics of the Zener diode are explained in the textbook "Vaccum-tube and Semiconductor Electronics," by Jacob Millman, McGraw-Hill Book Co., 1958, pages 116–119. The emitter of the transistor 20 is connected to the junction of the resistor and diode. The base of the second transistor 21 is connected directly to the collector of the transistor 20 while the emitter of transistor 21 is connected directly to the potential source 22. The collector of the transistor 21 is connected through a relay 25 to ground. Located across the relay coil 26 is a capacitor 27 which serves to hold the relay open for a predetermined period of time upon each operation of the control circuit. The relay 25 is of the double pole double throw type having one contact 28 of the relay connected to the collector of the transistor 21 while the second contact 29 is connected to the coil of a second relay 31. Connected in shunt with the coil 30 is a diode 39 which serves to discharge the coil 30 upon the termination of the operating signal. The relay 31 is also of the double pole double throw type having first and second contacts 32, 33 ganged together for simultaneous operation.

In considering the operation of the circuit shown in FIGURE 2, assume that at the beginning of the operation cycle the resistance of photocell 18 is small with respect to the resistance of photocell 17 by virtue of its receiving a maximum of reflected light from source 16. Consequently the larger portion of the voltage drop between the potential source 22 and ground will occur across photocell 17. Thus the voltage appearing on the base of transistor 20 will be close to that of the grounded side of photocell 18. It should be noted that the emitter of transistor 20 is clamped at a positive value in reference to ground by the Zener diode 24 and resistor 23. Thus, with the base at substantially ground potential, the transistor 20 will be non-conductive since its emitter will be positive with respect to the base. With the transistor 20 in a non-conductive state, there will be no potential drop across the resistor 41. Therefore, the full potential of the source 22 will be applied to the base of transistor 21, thereby biasing the transistor into its non-conductive state. The current flow through coil 26 will be insufficient to operate the relay 25 with the transistor 21 in a non-conductive state. Hence the relay will remain in its normally closed position, as shown in FIGURE 2. In this closed position the contact 28 will remain connected to the collector of transistor 21 while the contact 29 will remain in contact with the power source 34. With the contact 29 connected to the source 34, the relay coil 30 of the relay 31 will be energized thereby connecting the contacts 32, 33 to the Peltier junction 9—11 so as to pass a large current through this junction for the start of the cooling cycle. With the current passing from the p type piece of the junction to the n type piece, a cooling of the mirrored surface of the metal block 11 takes place. When the cooling of the block 11 has progressed sufficiently far, a "dew spot" will begin to form on the mirrored surface. This dew spot will decrease the amount of light being reflected from the polished surface of metal block 11 onto the photocell 18 while at the same time the amount of indirect or diffused illumination striking the photocell 17 will increase. This change in illumination striking the photocells will cause a corresponding change in the conductivity of the cells with photocell 17 becoming more conductive while photocell 18 will become less conductive. As the dew spot becomes larger, there will be a corresponding change in the voltage appearing at the base of transistor 20.

With the photocell 17 in a low resistance state while photocell 18 is exhibiting high resistance, the majority of the voltage drop between the source 22 and ground will occur across the cell 18. Under these conditions the voltage on the base of the transistor 20 will be substantially that of the source 22 thereby placing the transistor in a conductive state. With the transistor 20 conducting, there will be a voltage drop across the resistor 23 which will be sufficient to place transistor 21 in a conductive state. As the current through transistor 21 increases, the relay coil 26 will be energized thereby opening the relay 25. The energy stored in the capacitor 27 allows the relay 25 to remain in the open position for a predetermined period of time sufficient to complete the heat cycle. With the relay 25 opened, the contact 29 will be disconnected from the source 34 causing the relay 31 to become de-energized. With the relay 31 de-energized, the contacts 32—33 will close thus causing a reverse current to flow through the Peltier junction 9—11. This reverse current flow will start the heating cycle of the system.

The added resistor 36 is placed in the Peltier junction circuit to reduce the current thru the junction and admit only the current necessary to remove the dew spot from the reflecting surface.

Having the two photocells 17 and 18 in the control circuit permits the operation of the system to be based on a ratio of the light intensities reflected and diffused rather than being directly dependent on light intensity. Thus any fluctuations of the light source 16 will not affect the operation of the Peltier dew point hygrometer.

The operation of the system produces a "temperature bracketing" of the dew point. The temperature is continuously monitored by the thermistor 12 thereby giving an accurate indication of the dew point at the hygrometer location at any given time.

While we have shown and described a single embodiment of our invention, it should be obvious that various modifications may be made without departing from the scope thereof. Hence, it is our intention to cover in the attached claim not only the particular circuit shown in the drawing, but also modifications which fall within the true scope of our invention as set forth in the appended claim.

What is claimed is:

In a dew point hygrometer having a Peltier junction, control means for the junction comprising a first and second photosensitive semiconductor connected in series between a power source and a reference potential, a first transistor having its base connected to the junction of the photosensitive semiconductors, a resistor connected between the collector of the first transistor and the power source, a voltage divider system connected to the emitter of the first transistor so as to bias the emitter positive in reference to the reference potential, a second transistor, means for connecting the base of the second transistor directly to the collector of the first transistor, means for connecting the emitter of the second transistor directly to the power source, a first relay means connected to the collector of the second transistor, a capacitor connected across the first relay means, a second relay means connected to and controlled by the first relay means, means connecting the output of the second relay to the Peltier junction so that the direction of current flow through the junction will be controlled by the control means.

References Cited in the file of this patent

UNITED STATES PATENTS

| | | |
|---|---|---|
| 2,720,107 | McBrair | Oct. 11, 1955 |
| 2,893,237 | De Coriolis et al. | July 7, 1959 |
| 2,979,950 | Leone | Apr. 18, 1961 |